United States Patent [19]

Papania

[11] Patent Number: 4,987,670
[45] Date of Patent: Jan. 29, 1991

[54] METHOD OF ASSEMBLING AN OVERRUNNING ROLLER CLUTCH WITH IMPROVED SPRING RETENTION

[75] Inventor: James R. Papania, Sandusky, Ohio

[73] Assignee: General Motors Corporation, Detroit, Mich.

[21] Appl. No.: 494,336

[22] Filed: Mar. 19, 1990

Related U.S. Application Data

[62] Division of Ser. No. 373,134, Jun. 29, 1989, abandoned.

[51] Int. Cl.$^5$ ............................................. F16D 15/00
[52] U.S. Cl. ..................................... 29/451; 192/44; 192/45
[58] Field of Search .................. 192/41 R, 44, 45; 188/82.84; 29/451, 464, 418, 521

[56] References Cited

U.S. PATENT DOCUMENTS

| | | | |
|---|---|---|---|
| 3,087,588 | 4/1963 | Fischer | 192/45 |
| 4,664,237 | 5/1987 | Lederman et al. | 192/45 |
| 4,679,676 | 7/1987 | King et al. | 192/45 |
| 4,782,928 | 11/1988 | Lederman | 192/45 |
| 4,821,856 | 4/1989 | Lederman | 192/45 |

*Primary Examiner*—P. W. Echols
*Assistant Examiner*—Irene Cuda
*Attorney, Agent, or Firm*—Patrick M. Griffin

[57] ABSTRACT

An improved spring retention for a roller clutch energizing spring includes a relatively narrow, flexible and axially disposed retention tab lanced out of the flat end leaf of the spring, which snaps into an equally narrow, axially disposed retention groove in the end face of a cage journal block. This allows the strength of the journal block and the radial width of the spring to be maximized.

1 Claim, 2 Drawing Sheets

METHOD OF ASSEMBLING AN OVERRUNNING ROLLER CLUTCH WITH IMPROVED SPRING RETENTION

This is a division of application Ser. No. 07/373,134 filed on June 29, 1989, now abandoned.

This invention relates to overrunning roller clutches in general, and specifically an improved retention of an energizing spring to a clutch cage.

BACKGROUND OF THE INVENTION

Overrunning roller clutches are used in many automotive applications, especially in automatic transmissions, to provide selective relative rotation between a pair of races. A clutch cage, which is often integrally molded of plastic, is adapted to be installed in an annular space between the races. The races are maintained in a coaxial relation by bearing portions of the clutch cage, generally called journal blocks. The journal blocks must be as radially wide as possible in order to fit as closely as possible between the races, and thereby maintain the races as rigorously coaxial as possible. The annular space between the races also represents an upper limit on the potential radial width of any other clutch component that is located between the races when the clutch is installed.

One such component is the roller energizing spring, one of which is provided for each roller. The typical energizing spring, known as an accordion spring, is stamped from flat spring steel stock with a series of flat leaves joined in a V shape at a fold or pleat. The front end leaf engages the roller, while the back end leaf is joined to some part of the cage. Thus, the end leaves do not represent active parts of the springs. The pleats are the active part of the spring, the part that stores spring energy and determines how much work the spring can do on its roller. Accordion springs may be stamped with pleats that are axially or radially disposed, as a matter of design choice. Axial pleat springs are easy to install, in that the front leaf may be easily shaped to conform to the roller, while the rearmost pair of leaves may be easily shaped to press fit over some part of the cage as the spring is pressed radially into the cage. A drawback of axial pleat springs is that their leaves, which are radially disposed, block the annular space between the races. If a lubricant is radially directed through the annular space, as it often is, its flow may be disturbed, or may disturb the spring.

Thus, radial pleat springs may be preferred in such environments, since their leaves are axially disposed, and thus do not appreciably block oil flow. With a radial pleat spring, however, the annular space represents an upper limit on the radial width of the pleat, and thus a limit on the strength of the spring. Also, the endmost pair of leaves of a radial pleat spring opens axially, not radially, and so cannot be made to grip some part of the cage during spring assembly. As a consequence, the typical way of retaining a radial pleat accordion spring is to capture the entire radial width of the end of the spring in a slot in the end of the cage journal block. If the radial width of the spring is maximized, then the slot must be as wide, weakening the end of the journal block. In such a case, the journal block may have to be lengthened, or otherwise strengthened, to compensate. If the radial width of the spring were lessened, so as to fit in a narrower slot, then the size and strength of the spring pleat would be reduced. In that case, a heavier and more expensive metal stock may have to chosen for the spring. A new means of spring retention that did not require such a compromise between journal block and spring strength would be desirable.

SUMMARY OF THE INVENTION

The invention provides such an improved retention of the spring. In the preferred embodiment disclosed, the clutch cage is molded of plastic, with a plurality of journal blocks. Each journal block has a radially disposed end face in which is formed an axially disposed retention groove with a radial width that is significantly less than the annular space between the races, so as not to weaken the journal block significantly.

Each roller energizing spring, which is the radially pleated accordion type, has pleats and leaves that are as wide radially as it is feasible to make them within the annular space available. The end leaf of each spring has a flexible, axially disposed retention tab lanced out of it, which has a radial width substantially equal to the retention groove. In addition, a chamfer on the journal block leads to the end face. The spring may be installed by pressing it radially inwardly into the cage, thereby sliding the flexible retention tab over the chamfer and down the journal block end face until it snaps out into the groove. Although the tab is radially narrow, any force attempting to pull it radially out of the groove will be strongly resisted. Good retention is obtained without compromising the width of either the journal block or spring pleat.

It is, therefore, a general object of the invention to provide an improved means of retaining an energizing spring to a cage journal block that allows both the effective radial width of the journal block and the spring to be maximized.

It is another object of the invention to provide such an improved retention through the use of a retention tab lanced out of the end leaf of the spring that is significantly radially narrower than the spring leaf, and which fits into a retention groove in the journal block that is significantly radially narrower than the journal block, so that the size and strength of neither spring nor journal block need be compromised.

It is another object of the invention to provide an improved method of installing such a spring by providing an end face of the journal block with a lead in chamfer and providing an end leaf of the spring with a flexible retention tab so that the spring may be installed by sliding the flexible retention tab over the chamfer and down the journal block end face until the tab flexes out into the groove.

DESCRIPTION OF THE PREFERRED EMBODIMENT

These and other objects and features of the invention will appear from the following written description, and from the drawings, in which.

Figure 6:
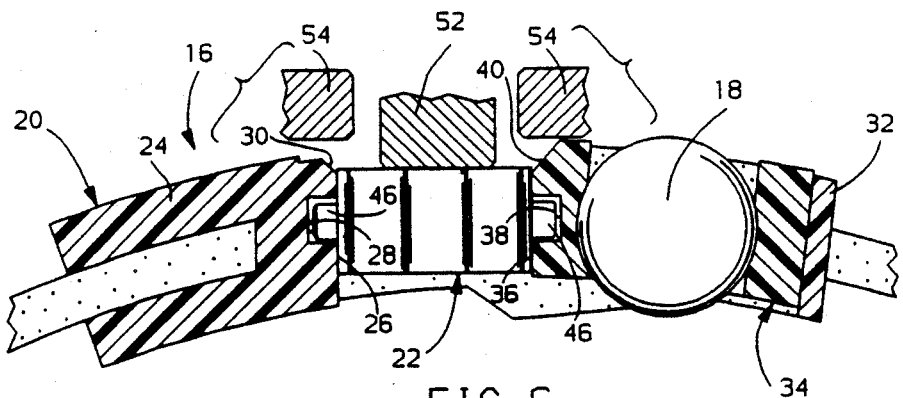
FIG. 6 shows the spring fully assembled.
Figure 7:
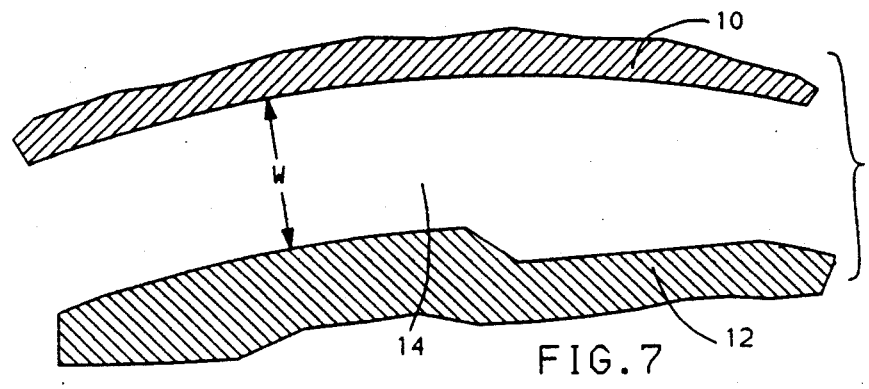
FIG. 7 shows a portion of the clutch races between which the roller clutch of the invention would be installed.

Referring first to FIGS. 6 and 7, a portion of an outer, pathway race 10 and an inner, cam race 12 are illustrated. When the races 10 and 12 are maintained in a basically coaxial relation, as shown, an annular space 14 is formed, which has a predetermined radial width W. A preferred embodiment of the roller clutch of the invention, indicated generally at 16, includes the basic components of a plurality of cylindrical steel rollers 18, a cage, indicated generally at 20, and a plurality of roller energizing springs, one of which is indicated generally at 22. Since clutch 16 must be installed in the annular space 14, the width W represents an inevitable limitation on the radial width of any part of cage 20 or spring 22. The invention allows each to be used to maximum effect, within that limitation.

Figure 3:
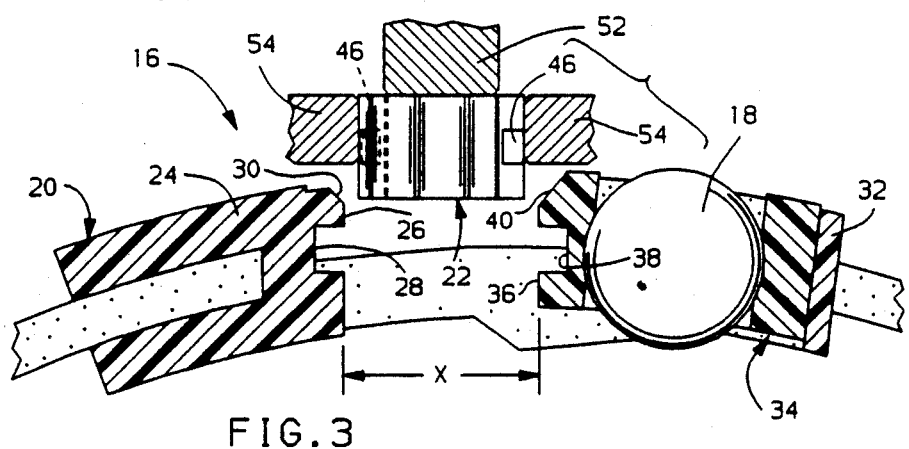
FIG. 3 is end view of a preferred embodiment of the roller clutch of the invention, with one side rail cut away, showing the spring just at the start of its assembly process.

Referring next to FIG. 3, clutch cage 20 is integrally molded of a suitable plastic material, with a plurality of journal blocks 24 that have a radial width almost equal to W, but with just enough clearance to allow them to be inserted into the annular space 14 without binding. As such, journal blocks 24 can maintain the races 10 and 12 rigorously, substantially coaxial, if they are strong enough to support the radial loads transferred between the races 10 and 12. Each journal block 24 has a flat, radially disposed end face 26 into which an axially disposed, square bottom retention groove 28 has been cut. At the top edge of end face 26, a lead in chamfer 30, which has a slope of about 45 degrees, slopes down toward retention groove 28. The radial width of retention groove 28 is substantially less than W, and therefore does not weaken journal block 24 appreciably. Cage 20 also includes an equal plurality of cross bars 32, each of which is opposed to a respective journal block 24. The particular embodiment of clutch 16 disclosed is unconventional in that it has a plurality of roller control cars, also integrally molded of the same plastic, one of which is indicated generally at 34. Each car 34 is slidably joined to the cage 20, and retains and controls an individual roller 18 as clutch 16 operates. Car 34 is also molded with a flat end face 36, retention groove 38, and lead in chamfer 40, similar to the equivalent structure on cage journal block 24. When car 34 is abutted with the adjacent cross bar 32, as shown, the circumferential spacing between the opposed end faces 26 and 36 is a distance X. The preferred embodiment of spring 22, described in detail next, has particular utility when used with a cage with cars like 34, but can be used with a more conventional clutch, as well.

Figures 1, 2:
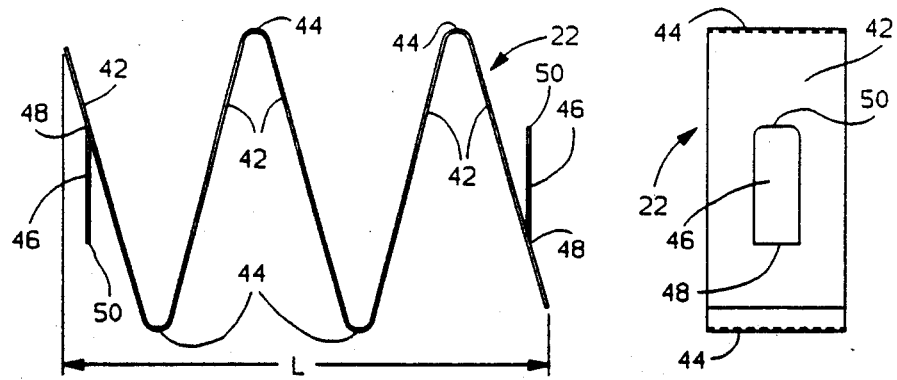
FIG. 1 is a plan view of a preferred embodiment of the spring of the invention, in its unflexed, pre-assembled state.
FIG. 2 is an end view of the spring.

Referring next to FIGS. 1 and 2, each spring 22 is an accordion type spring, stamped from flat steel stock with a series of flat leaves 42 joined to one another in V shaped pairs by pleats 44. Spring 22 is the radial pleat type, in which the pleats 44 are radially disposed when assembled to cage 20, and the leaves 42 are axially disposed. The width of the spring stock is substantially equal to W, or as close as it can be and still have the leaves 42 fit within the annular space 14. The free state length of spring 22, from end leaf 42 to end leaf 42, which is indicated at L, is made greater than X. Lanced out of each end leaf 42 is an axially directed retention tab 46, which has a rectangular shape basically matching the shape of a retention groove 38. Tab 46 is joined to end leaf 42 at a live hinge 48, and can therefore flex toward and away from end leaf 42 quite easily. However, any force attempting to flex tab 46 ninety degrees in the other direction would be very strongly resisted by the live hinge 48, which is not flexible in that direction. The end of tab 46 is rounded at 50, for a purpose described below.

Figure 4:
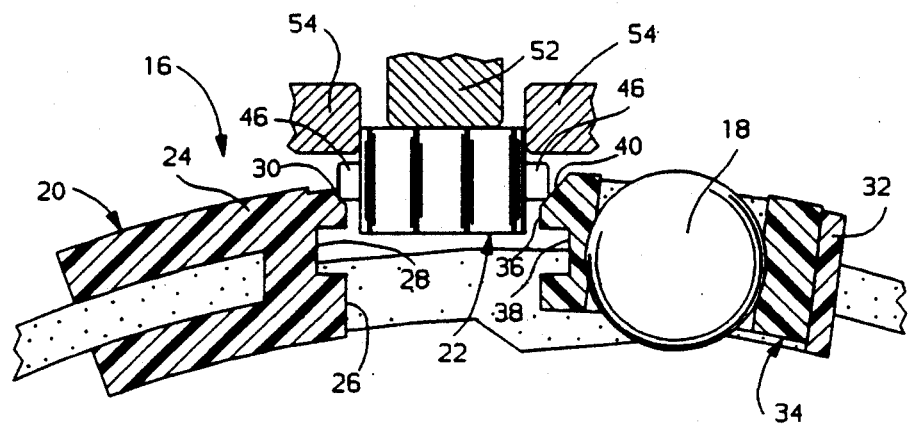
FIG. 4 shows the spring as it begins to compress during assembly.
Figure 5:
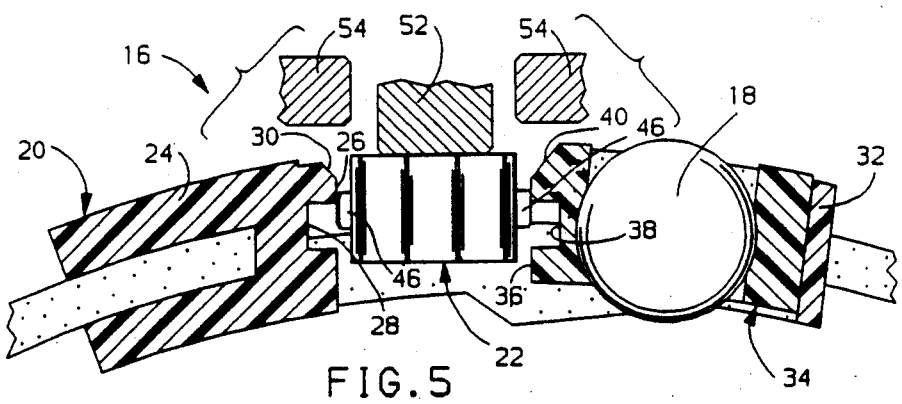
FIG. 5 shows the spring just before its retention tab snaps into the retention groove.

Referring next to FIGS. 3 through 5, the steps in the assembly of spring 22 to cage 20 are illustrated. An assembly apparatus consists of a plunger 52 flanked by two guides 54. Spring 22 is first loaded between the guides 54, as shown in FIG. 3, into an assembly condition, where all the leaves 42 are compressed toward one another, and the tabs 46 are flexed back into the planes of the end leaves 42. The length of spring 22 in the assembly condition is somewhat less than X. Car 34 would be maintained by a suitable jig against the adjacent cross bar 32. The guides 54 are moved until the spring 22 is centered between the two opposed end faces 26 and 36. Next, plunger 52 presses spring 22 radially inwardly until the tabs 46 move off of the guides 54 and flex out to bring the rounded ends 50 into contact with the two lead in chamfers 30 and 40, as shown in FIG. 4. Plunger 52 continues to press spring 22 down until the rounded tab ends 50 move over the lead in chamfers 30 and 40 and down onto the end faces 26 and 36, as tabs 46 are flexed back in to an extent. As shown in FIG. 5, the rounded tab ends 50 begin to move onto the upper edges of the retention grooves 28 and 38. This creates a self seating action because of the resilient energy stored in the flexed tabs 46, which pulls the rounded tab ends 50 past the edges of the retention grooves 28 and 38 as the tabs 46 begin to flex back toward their free state.

Referring next to FIG. 6, the tab rounded ends 50 finally slide completely past the upper edges of the retention grooves 28 and 38, and the retention tabs 46 snap back out completely to their free state, captured within the retention grooves 28 and 38. The spring end leaves 42 are abutted with the end faces 26 and 36, and spring 22 is strong enough to retain car 34 in the position shown, abutted with cross bar 32. The retention tabs 46 are closely contained within the retention grooves 28 and 38, but without binding. If an attempt is made to withdraw spring 22 either radial direction, the edges of the tabs 46 will be quickly brought into contact with the side walls of the retention grooves 28 and 38. Since the hinges 48 are not flexible in the radial direction, spring 22 is completely and securely retained to cage 20. Since only the radially narrow tabs 46 are captured, and not the entire width of the end leaves 42, the retention grooves 28 and 38 may be relatively narrow, so as not to significantly weaken either the journal block 24 or the car 34. Furthermore, since spring retention is independent of the end leaves 42, the radially disposed spring pleats 44 may be as wide in the radial direction as possible. The radial width and strength of both the journal block 24, car 34, and spring 22 are all maximized, without sacrificing the security of the retention of spring 22.

Variations of the preferred embodiment disclosed may be made. Any type of spring with a retention tab formed from an end leaf could be captured in a retention groove of similar size formed in the end face of a cage bearing portion, without appreciably weakening the cage bearing portion. The invention is particularly applicable to accordion springs, however, because of their flat end leaves. Accordion springs with axially disposed pleats could incorporate the invention, as well. But the invention has particular utility as applied to accordion springs like 22, with radially disposed pleats, since these are conventionally retained by capturing their total width in wide slots, which weakens the journal blocks. The retention tab need not necessarily be flexible, as it could conceivably be formed out of the end leaf and into the retention groove after the spring was in place. A flexible end leaf provides the additional advantage of being assembled by the press in, snap fit method disclosed, however. A spring with only one end leaf and retention tab could be used with a more conventional roller clutch, one that had journal blocks, but no roller control cars. The preferred embodiment of spring 22 has particular utility with the cage 20 disclosed, since the same type of retention groove can be provided in both journal block 24 and car 34, thereby allowing spring 22 to be totally symmetrical and assembled in either direction by the plunger 52 and guides 54. Therefore, it will be understood that it is not intended to limit the invention to just the preferred embodiment disclosed.

The embodiments of the invention in which an exclusive property or privilege is claimed are defined as follows:

1. A method for installing an accordion type energizing spring into a roller clutch of the type having a cage with a plurality of journal blocks, each of which has a flat end face, said roller clutch also having an equal plurality of roller control cars, each of which has a flat end face opposed to a respective journal block end face and circumferentially spaced therefrom by a predetermined distance, comprising the steps of, provingeach journal block and respective control car end face with a retention groove and a lead in chamfer sloping radially inwardly to said retention groove, providing said energizing spring with a pair of flat end leaves that are spaced apart by a free state length greater than said predetermined distance, providing said energizing spring end leaves each with a flexible retention tab bent out of the plane of said end leaf and sized so as to fit into a respective retention groove, compressing said spring end leaves between a pair of guides so as to move said retention tabs back into the planes of said end leaves and so as to compress said spring to a length substantially equal to said predetermined distance, centering said compressed spring between a respective pair of opposed end faces, pressing said spring with a relatively movable plunger inwardly until said compressed tabs slide off of said guides and flex out into contact with said respective end face lead in chamfers, and, pressing said spring farther in with said plunger until said tabs slide over said lead in chamfers and flex out into said retention grooves to retain said spring.

* * * * *